United States Patent [19]

Chung

[11] Patent Number: 5,982,443
[45] Date of Patent: Nov. 9, 1999

[54] APPARATUS AND METHOD FOR CONVERTING SCAN FORMAT OF VIDEO SIGNAL

[75] Inventor: Young Hak Chung, Seoul, Rep. of Korea

[73] Assignee: Hyundai Electronics Industries Co., Ltd., Kyoungki-Do, Rep. of Korea

[21] Appl. No.: 09/006,150

[22] Filed: Jan. 13, 1998

[30]     Foreign Application Priority Data

Apr. 19, 1997 [KR]  Rep. of Korea ....................... 97-14603

[51] Int. Cl.⁶ ....................................................... H04N 7/01
[52] U.S. Cl. ............................................ 348/441; 348/206
[58] Field of Search ................................... 348/441, 206; H04N 7/01

[56]              References Cited

U.S. PATENT DOCUMENTS

4,989,092  1/1991  Doyle .
5,267,045  11/1993  Stroomer .
5,337,089  8/1994  Fisch .

*Primary Examiner*—Sherrie Hsia
*Attorney, Agent, or Firm*—Merchant & Gould P.C.

[57]              ABSTRACT

An apparatus and a method for converting a scan format of a video signal. The video signal scan format conversion apparatus comprises a multiplexer for converting a plurality of input signals of a raster scan format into a single signal of the same format and successively outputting the converted signal, a FIFO memory unit for sequentially storing successive output signals of the raster scan format from the multiplexer and outputting the stored signals to primarily convert them into those of a vertical scan format, a FIFO controller for generating a write control signal to control a write operation of the FIFO memory unit, a first read address generator for generating read addresses to the FIFO memory unit, a dual port RAM unit for sequentially storing the primarily converted signals from the FIFO memory unit and outputting the stored signals to secondarily convert them into those of the vertical scan format, a write address generator for generating write addresses to the dual port RAM unit, and a second read address generator for generating read addresses to the dual port RAM unit. The input signal of the raster scan format is converted into that of the vertical scan format easy to calculate, thereby reducing the time required in combining pixel values. Therefore, the system can become simple in construction.

10 Claims, 9 Drawing Sheets

FIG. 1

Macroblock

FIG. 2 (PRIOR ART)

Raster Scan

FIG. 5

Vertical Scan

scan format conversion

FIG. 4 primarily converted data

APPARATUS AND METHOD FOR CONVERTING SCAN FORMAT OF VIDEO SIGNAL

BACKGROUND OF THE INVENTION

1. Field of the Invention

The present invention relates in general to a scan format of a video signal, and more particularly to an apparatus and a method for converting a scan format of a video signal, in which an input signal of a raster scan format is converted into that of a vertical scan format easy to calculate.

2. Description of the Prior Art

As well known, the Moving Pictures Experts Group (referred to hereinafter as MPEG) initially proposed MPEG1 (formal name: ISO/IEC 1172) in the 1.5 Mbps or more class based on storage media. Thereafter, MPEG2 in the 5 Mbps or more class began to be discussed for the first time in the U.S. Santa Clara Conference, September 1990, when the MPEG1 came to an end, resulting in the establishment of MPEG2 International Standard (IS) in the Singapore Conference, 1994.

The MPEG2 is composed of three small groups, or a system, video and audio. The formal names of these three international standards are ISO/IEC 13818-1 (system), ISO/IEC 13818-2 (video) and ISO/IEC 13818-3 (audio). At the present, the MPEG2 is the international common standard in the image compression field.

However, in a conventional MPEG2 encoder system, a signal of a raster scan format is applied to a pixel combiner in a mode determination unit, resulting in a large amount of time being required in combining pixel values. Further, the system becomes complex in construction, resulting in an increase in the installation cost thereof.

On the other hand, a conventional apparatus for converting a scan line format of a digital video signal is shown in U.S. Pat. No. 5,337,089, issued to Philips Electronics North America Corporation, New York, N.Y. The conventional scan line format conversion apparatus is adapted to limit a signal bandwidth to that of a transmission channel over which the video signal is to be transmitted to a receiver and to match an HDTV format with that of a standard NTSC signal. The conventional scan line format conversion apparatus is of particular utility for conversion between the presently contemplated HDTV format of 1050 scan lines per frame of paired interlaced fields at a field frequency of 60 Hz, and a progressive frame format of 525 scan lines per frame at a frame frequency of 30 Hz. To this end, the conventional scan line format conversion apparatus comprises first multiplexing means for performing an alternate multiplexing operation, a pair of transmission paths coupled respectively to respective outputs of the first multiplexing means so that even-numbered fields are supplied to a first of the paths and odd-numbered fields are supplied to a second of the paths, second multiplexing means for alternately outputting even-numbered fields transmitted by the first transmission path and odd-numbered fields transmitted by the second transmission path, delay means in the first transmission path for delaying each even-numbered field therein for substantially one field period and successively supplying the delayed even-numbered fields to the output of the first transmission path, low pass digital filter means in the second transmission path for vertically low pass filtering each odd-numbered field and successively supplying the filtered odd-numbered fields to the output of the second transmission path, and field store means coupled to the output of the second multiplexing means for receiving the delayed even-numbered fields and the filtered odd-numbered fields. The field store means is further adapted to produce subsampled fields at its output in synchronism with the even-numbered fields of the received signal, so that the subsampled fields constitute a digital output signal.

With the above-mentioned construction, the conventional scan line format conversion apparatus limits the signal bandwidth to that of the transmission channel over which the video signal is to be transmitted to the receiver and matches the HDTV format with that of the standard NTSC signal. However, the above-mentioned conventional scan line format conversion apparatus has a disadvantage in that it cannot reduce a pixel value of external input data.

SUMMARY OF THE INVENTION

Therefore, the present invention has been made in view of the above problem, and it is an object of the present invention to provide an apparatus and a method for converting a scan format of a video signal, in which an input signal of a raster scan format is converted into that of a vertical scan format easy to calculate, thereby reducing the time required in combining pixel values, so that the system can become simple in construction, resulting in a reduction in the installation cost thereof.

In accordance with one aspect of the present invention, there is provided an apparatus for converting a scan format of a video signal, comprising a multiplexer for converting a plurality of input signals of a raster scan format into a single signal of the same format and successively outputting the converted signal; FIFO memory means for sequentially storing successive output signals of said raster scan format from said multiplexer and outputting the stored signals to primarily convert them into those of a vertical scan format; FIFO control means for generating a write control signal to control a write operation of said FIFO memory means; a first read address generator for generating read addresses to said FIFO memory means; dual port RAM means for sequentially storing the primarily converted signals from said FIFO memory means and outputting the stored signals to secondarily convert them into those of said vertical scan format; a write address generator for generating write addresses to said dual port RAM means; and a second read address generator for generating read addresses to said dual port RAM means.

In accordance with another aspect of the present invention, there is provided a method for converting a scan format of a video signal, comprising the first step of converting a plurality of input signals of a raster scan format into a single signal of the same format; the second step of storing the single signal of said raster scan format into a FIFO memory unit and outputting the stored signal to primarily convert it into that of a vertical scan format; the third step of storing the primarily converted signal from said FIFO memory unit into a dual port RAM unit; and the fourth step of reading the primarily converted signal stored in said dual port RAM unit to secondarily convert it into that of said vertical scan format.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B are views illustrating the conversion from the raster scan format to a vertical scan format in accordance with the present invention;

DETAILED DESCRIPTION OF THE PREFERRED EMBODIMENTS

Figure 6:
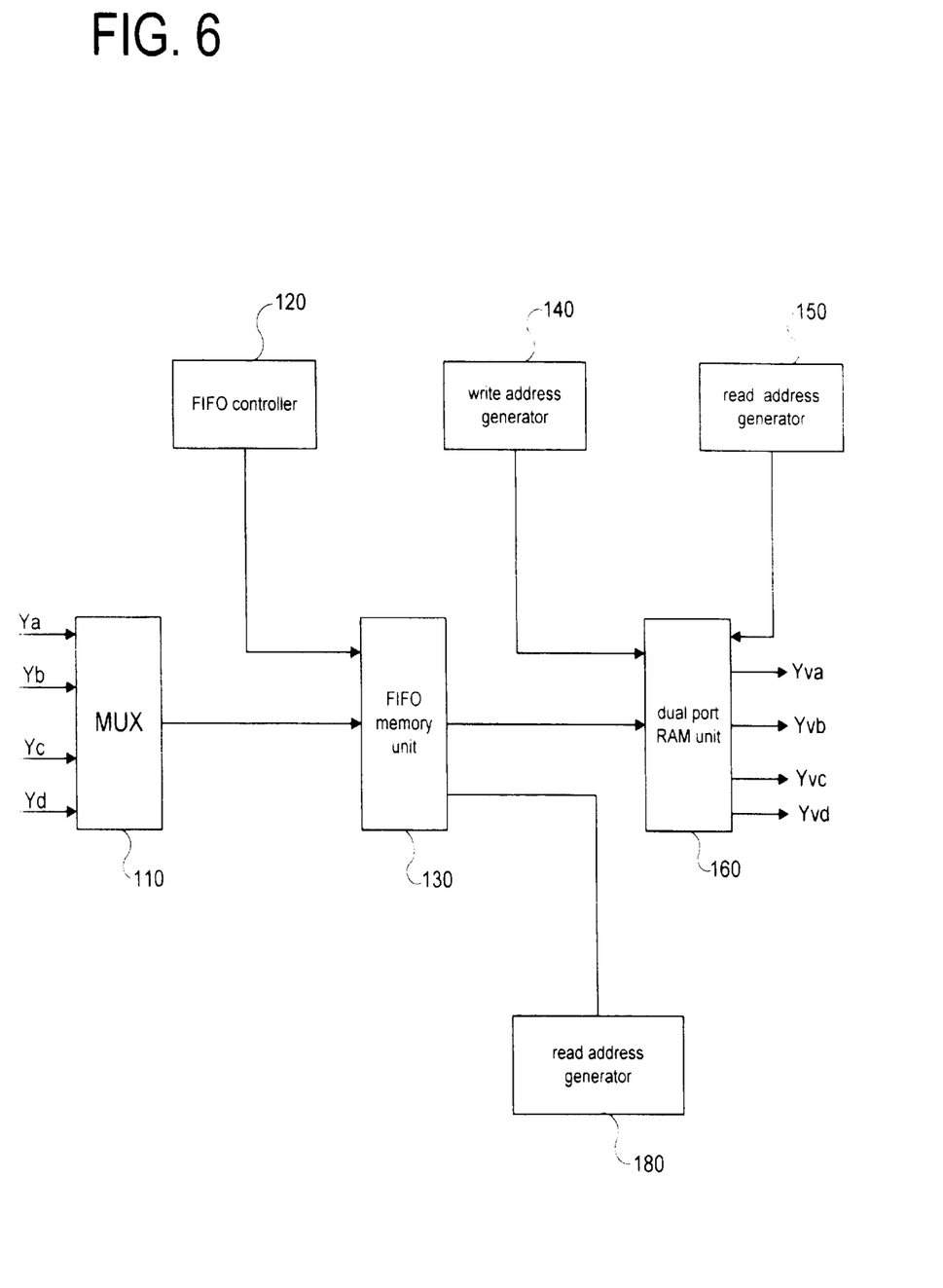
FIG. 6 is a block diagram of an apparatus for converting a scan format of a video signal in accordance with the present invention.

FIG. 6 is a block diagram of an apparatus for converting a scan format of a video signal in accordance with the present invention. As shown in this drawing, the video signal scan format conversion apparatus comprises a multiplexer 110 for receiving four 9-bit pixel-unit signals Ya, Yb, Yc and Yd and outputting a single 36-bit signal, a first-in-first-out (referred to hereinafter as FIFO) memory unit 130 for sequentially storing successive 36-bit signals from the multiplexer 110 and sequentially outputting the stored 36-bit signals in the unit of 9 bits, a FIFO controller 120 for controlling a write operation of the FIFO memory unit 130, a read address generator 180 for generating read addresses to the FIFO memory unit 130, a dual port random access memory (referred to hereinafter as RAM) unit 160 for sequentially storing and outputting successive 9-bit signals from the FIFO memory unit 130, a write address generator 140 for generating write addresses to the dual port RAM unit 160, and a read address generator 150 for generating read addresses to the dual port RAM unit 160.

Figure 7:
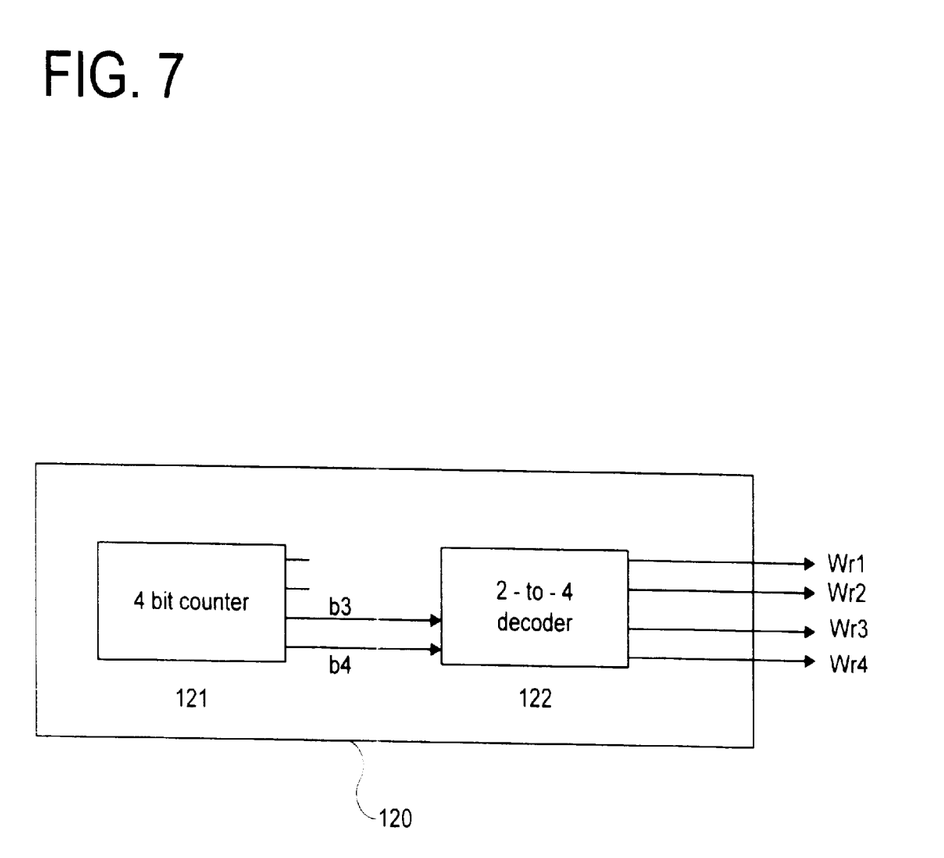
FIG. 7 is a detailed block diagram of a FIFO controller in FIG. 6.

FIG. 7 is a detailed block diagram of the FIFO controller 120 in FIG. 6. As shown in this drawing, the FIFO controller 120 includes a 4-bit counter 121 for performing a 4-bit counting operation, and a decoder 122 for decoding high-order 2 bits of a 4-bit output signal from the 4-bit counter 121.

The 4-bit counter 121 sequentially outputs 0000, 0001, 0010, 0011, 0100, 0101, 0110, 0111, . . . . Only the high-order 2 bits of each 4-bit output from the 4-bit counter 121 are applied to the decoder 122. As a result, the values of 00 (0), 01 (1), 10 (2) and 11 (3) from the 4-bit counter 121 are applied to the decoder 122, respectively, repeatedly four times. Then, the decoder 122 provides the following 4-bit outputs in response to the 2-bit inputs supplied from the 4-bit counter 121:

TABLE 1

| INPUT (2 BITS) | OUTPUT (4 BITS) |
|---|---|
| 00 | 0001 |
| 01 | 0010 |
| 10 | 0100 |
| 11 | 1000 |

Figure 8:
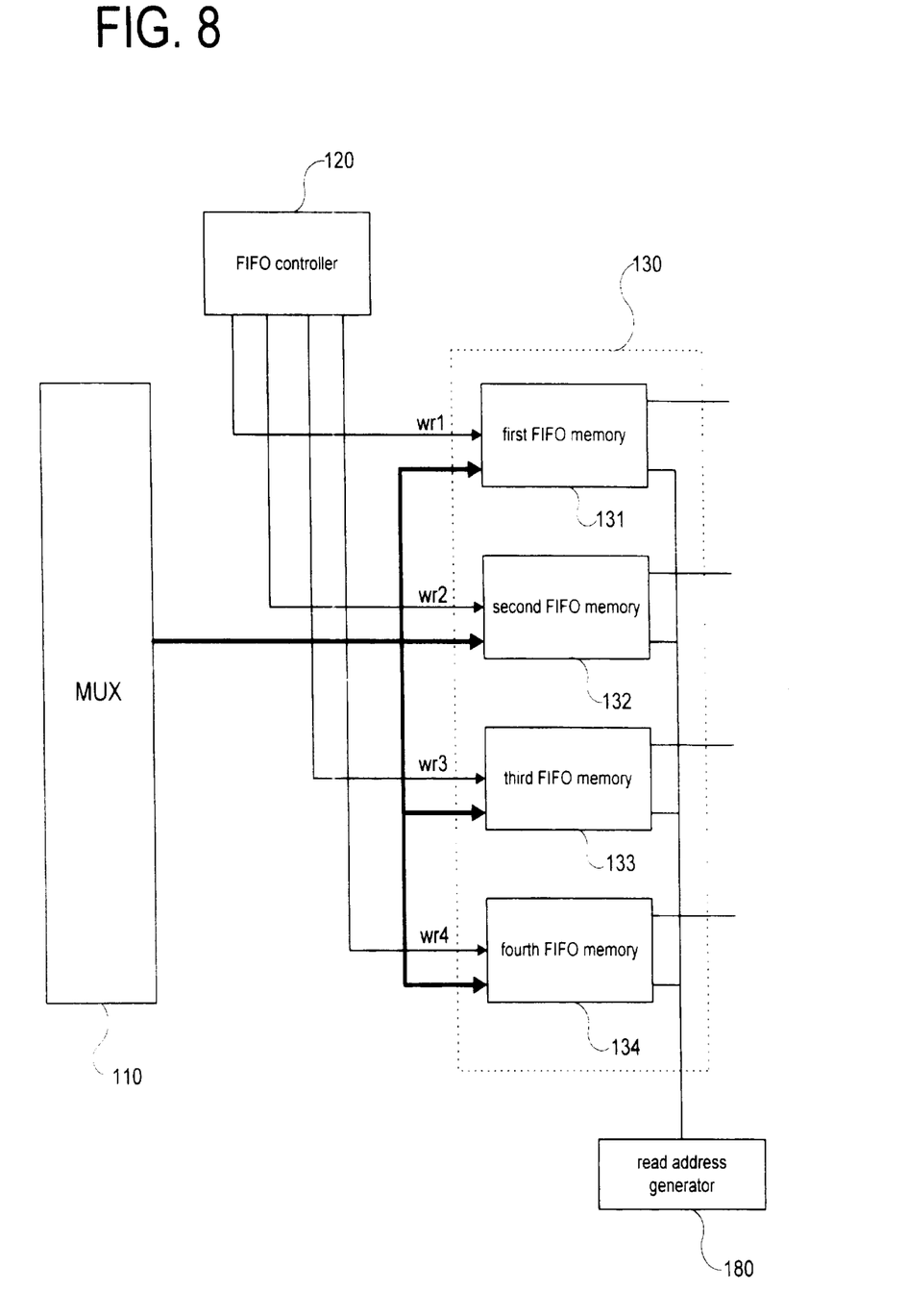
FIG. 8 is a detailed block diagram of a FIFO memory unit in FIG. 6.

FIG. 8 is a detailed block diagram of the FIFO memory unit 130 in FIG. 6. As shown in this drawing, the FIFO memory unit 130 includes first to fourth FIFO memories 131, 132, 133 and 134, each of which stores 36 bits of a corresponding one of the successive 36-bit signals from the multiplexer 110 over four times in the unit of 9 bits under the control of the decoder 122 in the FIFO controller 120. Namely, the successive 36-bit signals from the multiplexer 110 are horizontally stored into the FIFO memory unit 130, as shown in FIG. 3A.

Figure 5:
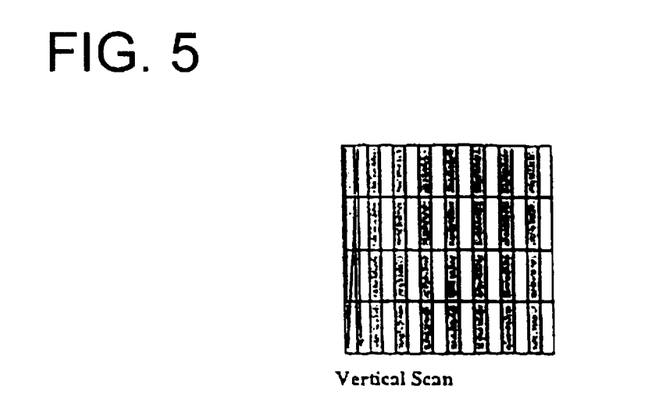
FIG. 5 is a view illustrating secondarily converted data of the vertical scan format in accordance with the present invention.
Figure 9:
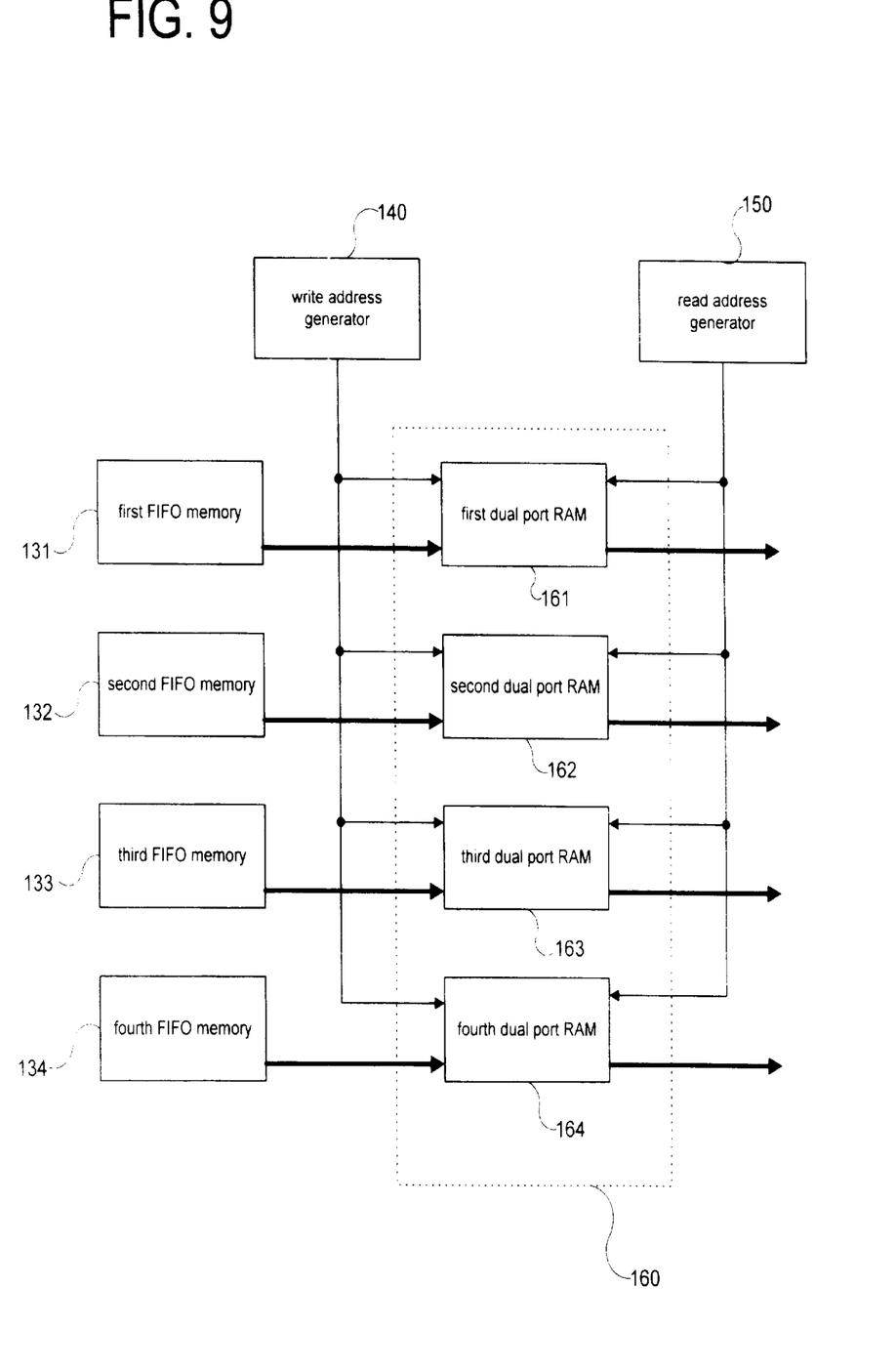
FIG. 9 is a detailed block diagram of a dual port RAM unit in FIG. 6.

FIG. 9 is a detailed block diagram of the dual port RAM unit 160 in FIG. 6. As shown in this drawing, the dual port RAM unit 160 includes first to fourth dual port RAMs 161, 162, 163 and 164 for sequentially storing the successive 9-bit signals from the FIFO memory unit 130 in response to the write addresses from the write address generator 140. Further, the first to fourth dual port RAMs 161, 162, 163 and 164 sequentially output the stored 9-bit signals in response to the read addresses from the read address generator 150. As a result, the successive 9-bit signals from the first to fourth dual port RAMs 161, 162, 163 and 164 are outputted vertically as shown in FIGS. 3B and 5. Noticeably, the write and read addresses to the dual port RAM unit 160 are alternately generated by the write and read address generators 140 and 150, as seen from the below table 2.

TABLE 2

| FORMAT | ADDRESS |
|---|---|
| A | 0 1 2 3 4 5 |
| B | 0 16 32 48 1 17 33 |

As seen from the above table 2, data is written into the dual port RAM unit 160 in the format A by the write address generator 140, and the written data is read from the dual port RAM unit 160 in the format B by the read address generator 150. In this manner, data collision can be prevented in the write and read operations of the dual port RAM unit 160.

The operation of the video signal scan format conversion apparatus with the above-mentioned construction in accordance with the present invention will hereinafter be described in detail.

First, upon receiving four 9-bit pixel-unit data Ya, Yb, Yc and Yd, the multiplexer 110 integrates them into single 36-bit data. Then, the multiplexer 110 outputs successive 36-bit data to the FIFO memory unit 130.

The FIFO memory unit 130 sequentially stores the successive 36-bit data from the multiplexer 110 under the control of the decoder 122 in the FIFO controller 120. Namely, if the output signal from the 4-bit counter 121 in the FIFO controller 120 is 00, the output signal from the decoder 122 is 0001 as seen from the table 1. As a result, the first 36-bit data from the multiplexer 110 is stored in the first FIFO memory 131 in the FIFO memory unit 130. At this time, because the same signal from the decoder 122 is outputted repeatedly four times, 36 bits of the first 36-bit data from the multiplexer 110 are stored in the first FIFO memory 131 over four times in the unit of 9 bits, as shown in FIG. 3A. Then, if the output signal from the 4-bit counter 121 is 01, the output signal from the decoder 122 is 0010 as seen from the table 1. As a result, the second 36-bit data from the multiplexer 110 is stored in the second FIFO memory 132. Because the same signal from the decoder 122 is outputted repeatedly four times, 36 bits of the second 36-bit data from the multiplexer 110 are stored in the second FIFO memory 132 over four times in the unit of 9 bits, as shown in FIG. 3A. Similarly, in the case where the output signal from the 4-bit counter 121 is 10 and 11 and the output signal from the decoder 122 is 0100 and 1000, the third and fourth 36-bit data from the multiplexer 110 are stored in the third and fourth FIFO memories 133 and 134, respectively, in the above-mentioned manner.

After the data of up to four lines are stored respectively in the first to fourth FIFO memories 131–134, they are sequentially outputted to the dual port RAM unit 160 in the unit of 9 bits in response to the read addresses from the read address generator 180.

Figure 1:
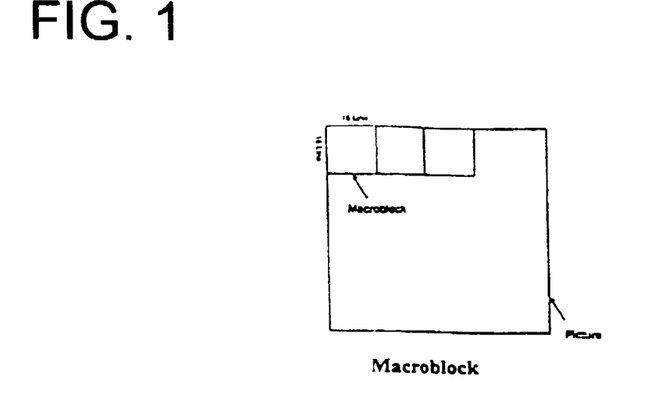
FIG. 1 is a view illustrating a general macroblock.
Figure 2:
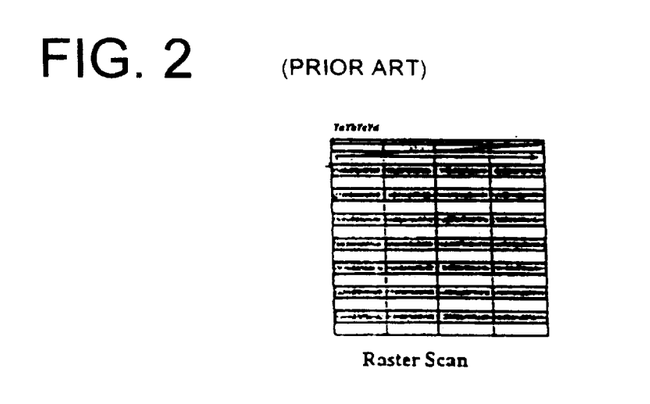
FIG. 2 is a view illustrating a general raster scan format.
Figure 4:
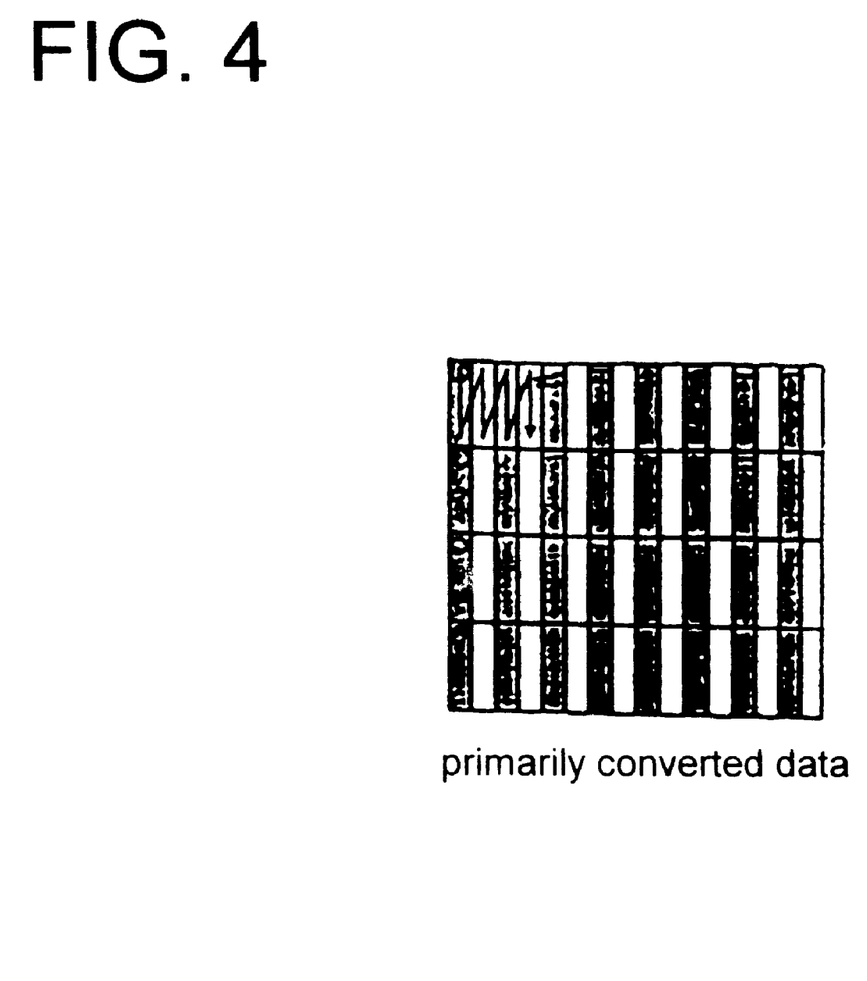
FIG. 4 is a view illustrating primarily converted data of the vertical scan format in accordance with the present invention.

In the dual port RAM unit 160, the first to fourth dual port RAMs 161, 162, 163 and 164 sequentially store the successive 9-bit data from the first to fourth FIFO memories 131–134 in the FIFO memory unit 130 in response to the write addresses from the write address generator 140. As a result, successive 36-bit data are vertically stored sequentially in the first to fourth dual port RAMs 161, 162, 163 and 164, as shown in FIG. 4.

Then, the 36-bit data stored respectively in the first to fourth dual port RAMs 161–164 are read in response to the read addresses from the read address generator 150.

Noticeably, the write and read orders of the dual port RAM unit 160 are different from each other. For example, as seen from the table 2, data from the FIFO memory unit 130 is written into the dual port RAM unit 160 in the format A by the write address generator 140, and the written data is read from the dual port RAM unit 160 in the format B by the read address generator 150. In other words, the successive 9-bit data from the FIFO memory unit 130 are horizontally stored in the dual port RAM unit 160 and the stored data are vertically read from the dual port RAM unit 160.

Figure 10:
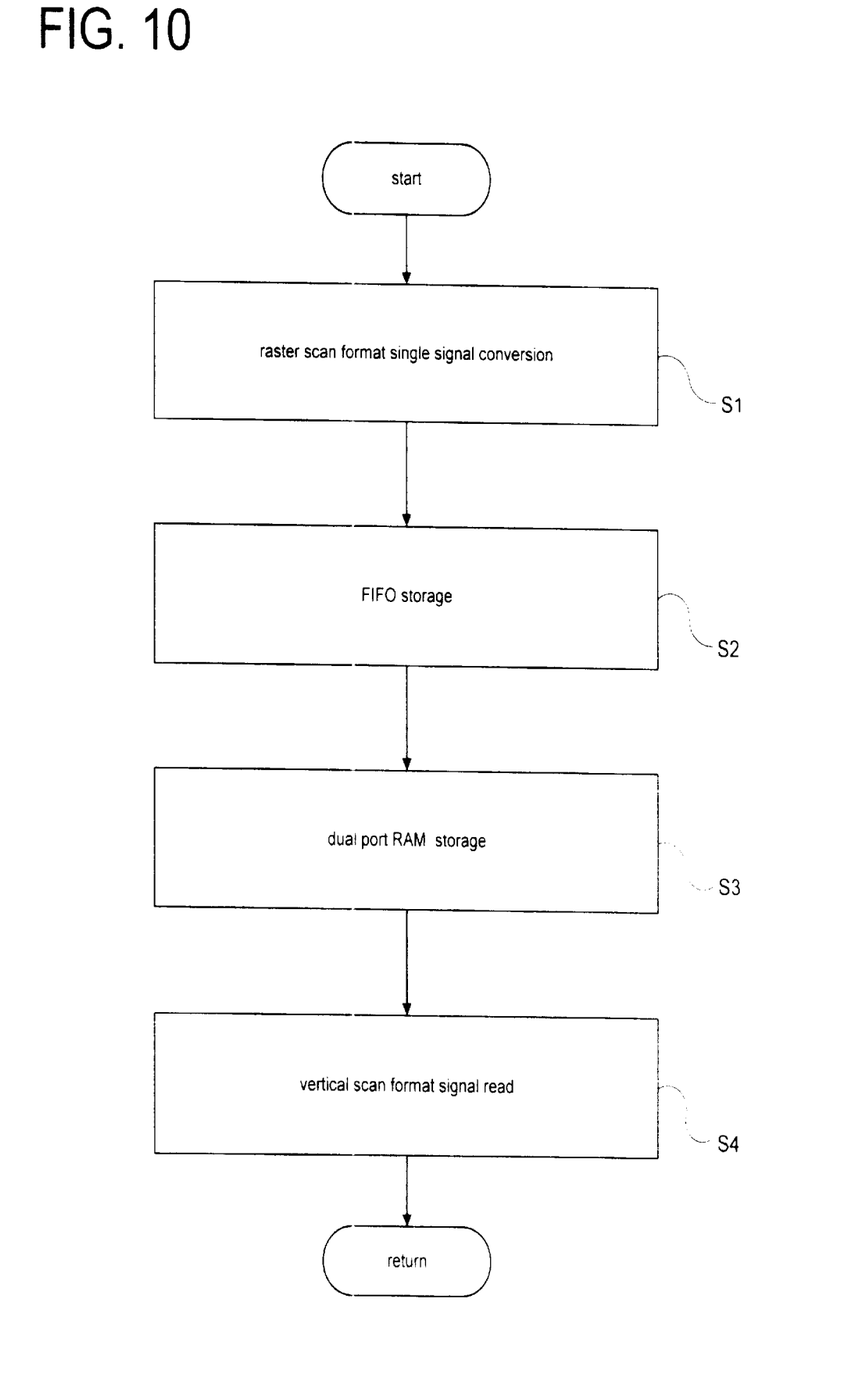
FIG. 10 is a flowchart illustrating a method for converting the scan format of the video signal in accordance with the present invention.

FIG. 10 is a flowchart illustrating a method for converting the scan format of the video signal in accordance with the present invention. As shown in this drawing, the video signal scan format conversion method comprises a raster scan format single signal conversion step S1 of converting a plurality of input signals of a raster scan format into a single signal of the same format, a FIFO storage step S2 of storing the single signal of the raster scan format into the FIFO memory unit 130 and outputting the stored signal to primarily convert it into that of a vertical scan format, a dual port RAM storage step S3 of storing the primarily converted signal from the FIFO memory unit 130 into the dual port RAM unit 160, and a vertical scan format signal read step S4 of reading the primarily converted signal stored in the dual port RAM unit 160 to secondarily convert it into that of the vertical scan format.

Figure 11:
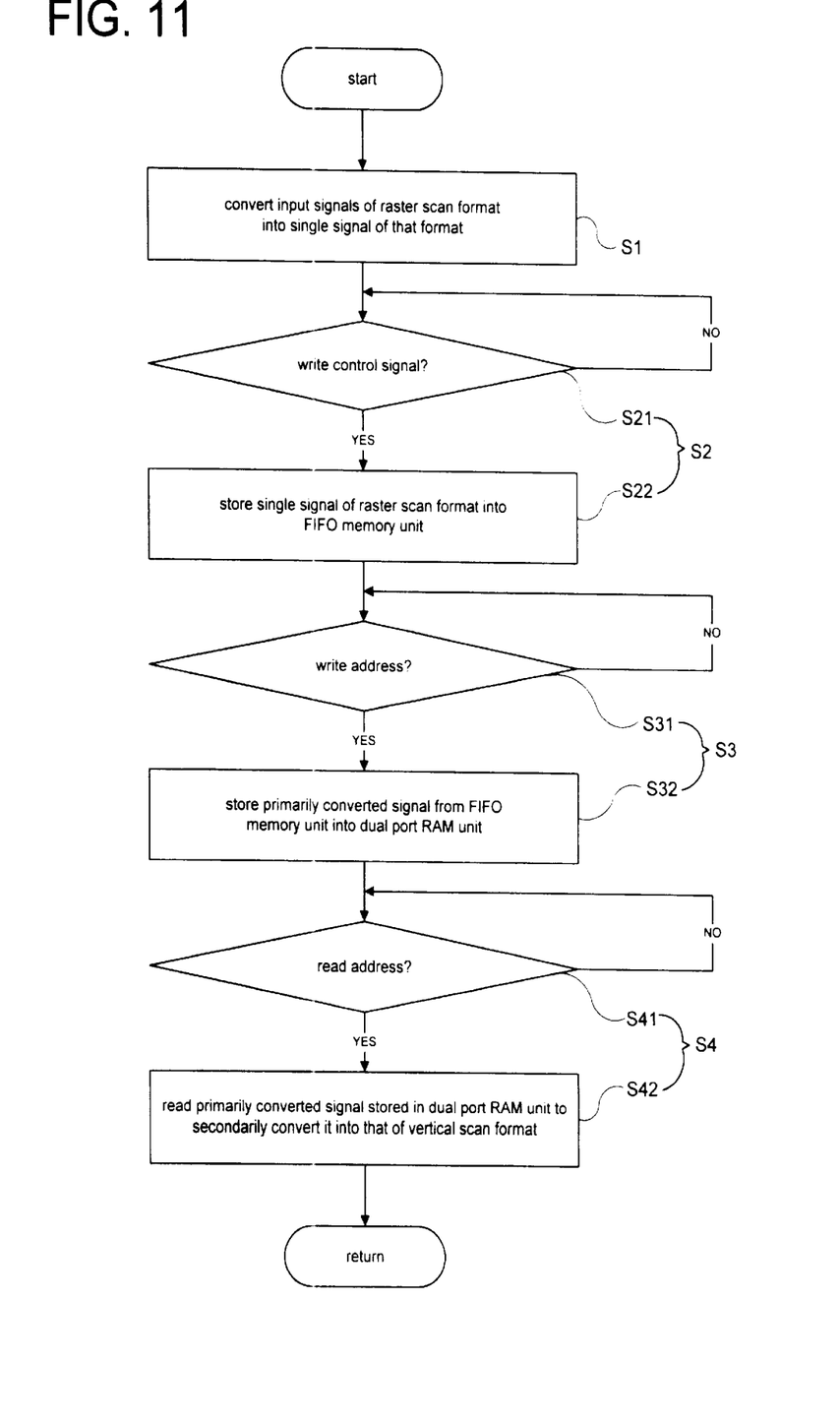
FIG. 11 is a flowchart in detail illustrating the video signal scan format conversion method in FIG. 10.

FIG. 11 is a flowchart in detail illustrating the video signal scan format conversion method in FIG. 10. As shown in this drawing, the FIFO storage step S2 includes step S21 of determining whether a write control signal is received, and step S22 of storing the single signal of the raster scan format into the FIFO memory unit 130 in response to an address of the write control signal if the write control signal is received at the above step S21 and outputting the stored signal to primarily convert it into that of the vertical scan format, as shown in FIG. 4. The dual port RAM storage step S3 includes step S31 of determining whether a write address from the write address generator 140 is received, and step S32 of storing the primarily converted signal from the FIFO memory unit 130 into the dual port RAM unit 160 if the write address from the write address generator 140 is received at the above step S31. The vertical scan format signal read step S4 includes step S41 of determining whether a read address from the read address generator 150 is received, and step S42 of reading the primarily converted signal stored in the dual port RAM unit 160 to secondarily convert it into that of the vertical scan format, as shown in FIGS. 3B and 5, if the read address from the read address generator 150 is received at the above step S41.

As apparent from the above description, according to the present invention, the input signal of the raster scan format is converted into that of the vertical scan format easy to calculate, thereby reducing the time required in combining pixel values. Therefore, the system can become simple in construction, resulting in a reduction in the installation cost thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for converting a scan format of a video signal, comprising:
   a multiplexer for converting a plurality of input signals of a raster scan format into a single signal of the same format and successively outputting the converted signal;
   FIFO memory means for sequentially storing successive output signals of said raster scan format from said multiplexer and outputting the stored signals to primarily convert them into those of a vertical scan format;
   FIFO control means for generating a write control signal to control a write operation of said FIFO memory means;
   a first read address generator for generating read addresses to said FIFO memory means;
   dual port RAM means for sequentially storing the primarily converted signals from said FIFO memory means and outputting the stored signals to secondarily convert them into those of said vertical scan format;
   a write address generator for generating write addresses to said dual port RAM means; and
   a second read address generator for generating read addresses to said dual port RAM means.

2. An apparatus for converting a scan format of a video signal, as set forth in claim 1, wherein said FIFO control means includes:
   a 4-bit counter for performing a 4-bit counting operation; and
   a decoder for decoding high-order 2 bits of a 4-bit output signal from said 4-bit counter to generate said write control signal.

3. An apparatus for converting a scan format of a video signal, as set forth in claim 1, wherein said FIFO memory means includes first to fourth FIFO memories each for storing a corresponding one of the successive output signals of said raster scan format from said multiplexer in response to said write control signal and outputting the stored signal in response to a corresponding one of said read addresses from said first read address generator to primarily convert it into that of said vertical scan format.

4. An apparatus for converting a scan format of a video signal, as set forth in claim 3, wherein said dual port RAM means includes:

a first dual port RAM for storing the primarily converted signal from said first FIFO memory in response to a corresponding one of said write addresses from said write address generator and outputting the stored signal in response to a corresponding one of said read addresses from said second read address generator to secondarily convert it into that of said vertical scan format;

a second dual port RAM for storing the primarily converted signal from said second FIFO memory in response to a corresponding one of said write addresses from said write address generator and outputting the stored signal in response to a corresponding one of said read addresses from said second read address generator to secondarily convert it into that of said vertical scan format;

a third dual port RAM for storing the primarily converted signal from said third FIFO memory in response to a corresponding one of said write addresses from said write address generator and outputting the stored signal in response to a corresponding one of said read addresses from said second read address generator to secondarily convert it into that of said vertical scan format; and a fourth dual port RAM for storing the primarily converted signal from said fourth FIFO memory in response to a corresponding one of said write addresses from said write address generator and outputting the stored signal in response to a corresponding one of said read addresses from said second read address generator to secondarily convert it into that of said vertical scan format.

5. An apparatus for converting a scan format of a video signal, as set forth in claim 4, wherein said write address generator and said second read address generator are adapted to generate address codes of different formats.

6. An apparatus for converting a scan format of a video signal, as set forth in claim 5, wherein said address code generated by said write address generator is 0, 1, 2, 3, 4, . . . , and said address code generated by said second read address generator is 0, 16, 32, 48, 1, 17, . . . , .

7. A method for converting a scan format of a video signal, comprising the steps of:

(a) converting a plurality of input signals of a raster scan format into a single signal of the same format;

(b) storing the single signal of said raster scan format into a FIFO memory unit and outputting the stored signal to primarily convert it into that of a vertical scan format;

(c) storing the primarily converted signal from said FIFO memory unit into a dual port RAM unit; and (d) reading the primarily converted signal stored in said dual port RAM unit to secondarily convert it into that of said vertical scan format.

8. A method for converting a scan format of a video signal, as set forth in claim 7, wherein said step (b) includes the step of storing 36 bits of 36-bit data of said raster scan format into said FIFO memory unit over four times in the unit of 9 bits in response to an address of a write control signal.

9. A method for converting a scan format of a video signal, as set forth in claim 7, wherein said step (c) includes the step of storing the primarily converted signal from said FIFO memory unit into said dual port RAM unit in the unit of 9 bits in response to a write address.

10. A method for converting a scan format of a video signal, as set forth in claim 7, wherein said step (d) includes the step of reading the primarily converted signal stored in said dual port RAM unit in response to a read address to secondarily convert it into that of said vertical scan format, said read address having a format different from that of a write address to said dual port RAM unit.

* * * * *